J. C. FRENCH.
BREAST CUTTER EXCAVATING MACHINE.
APPLICATION FILED NOV. 6, 1913.
1,329,591.
Patented Feb. 3, 1920.
10 SHEETS—SHEET 1.
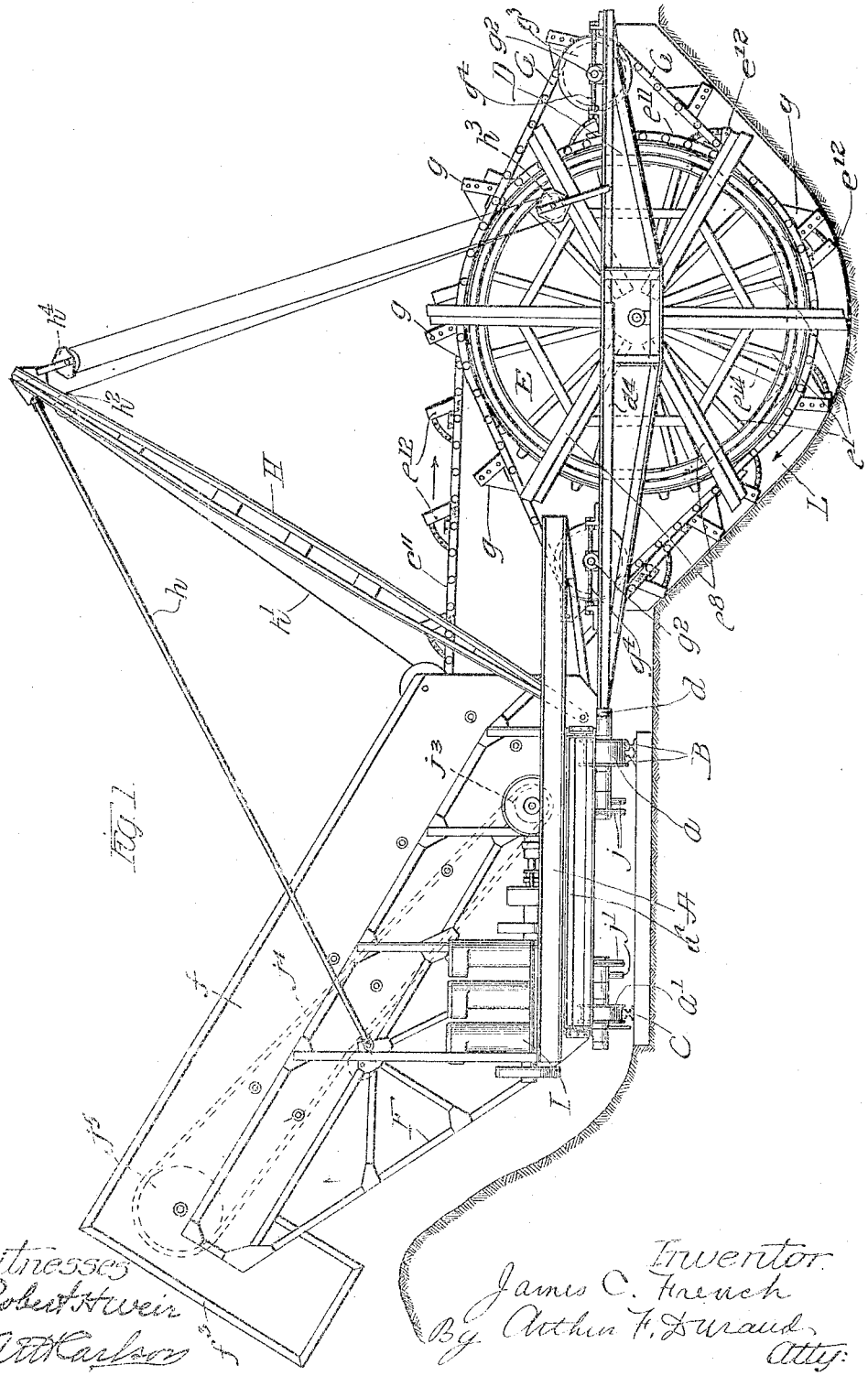

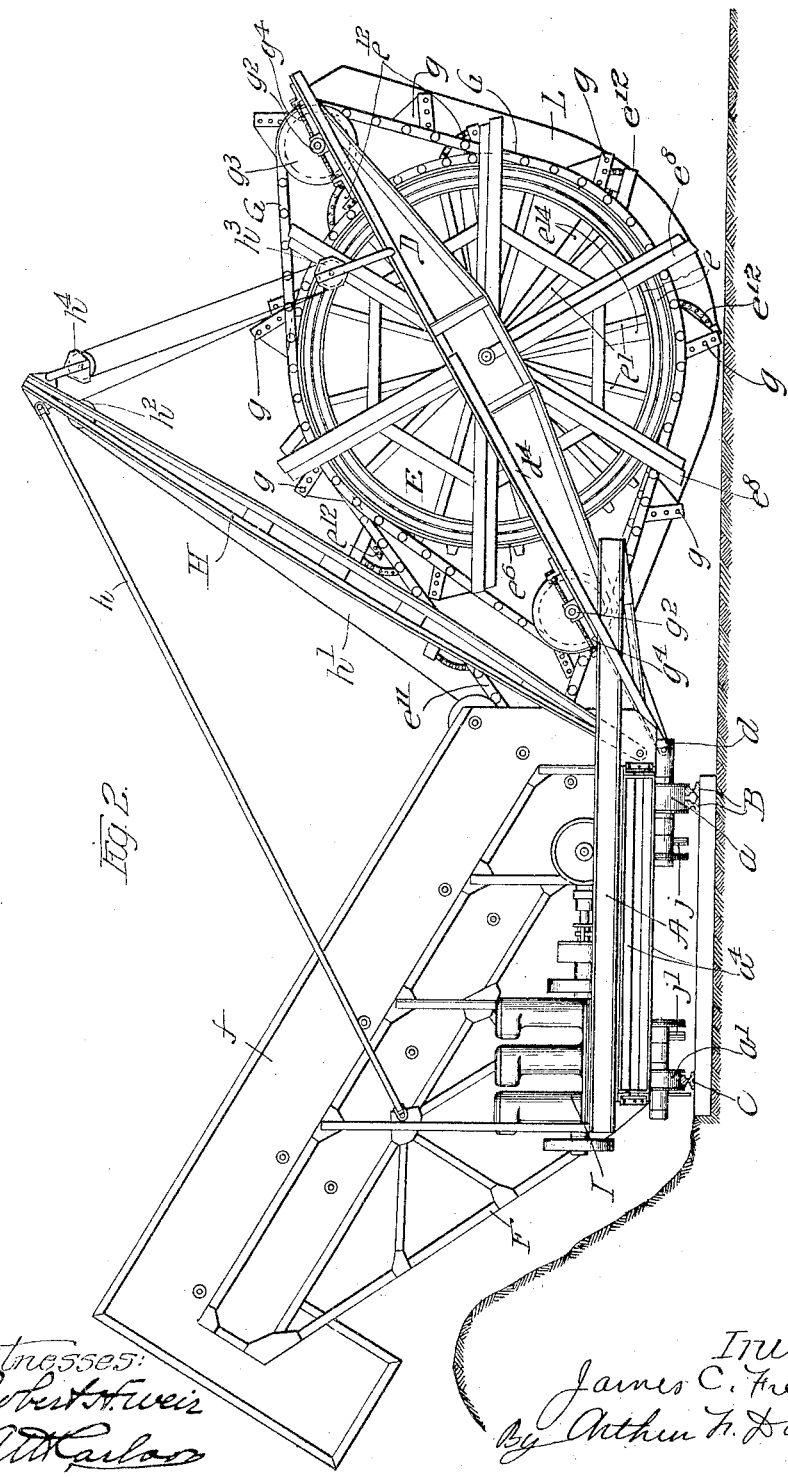

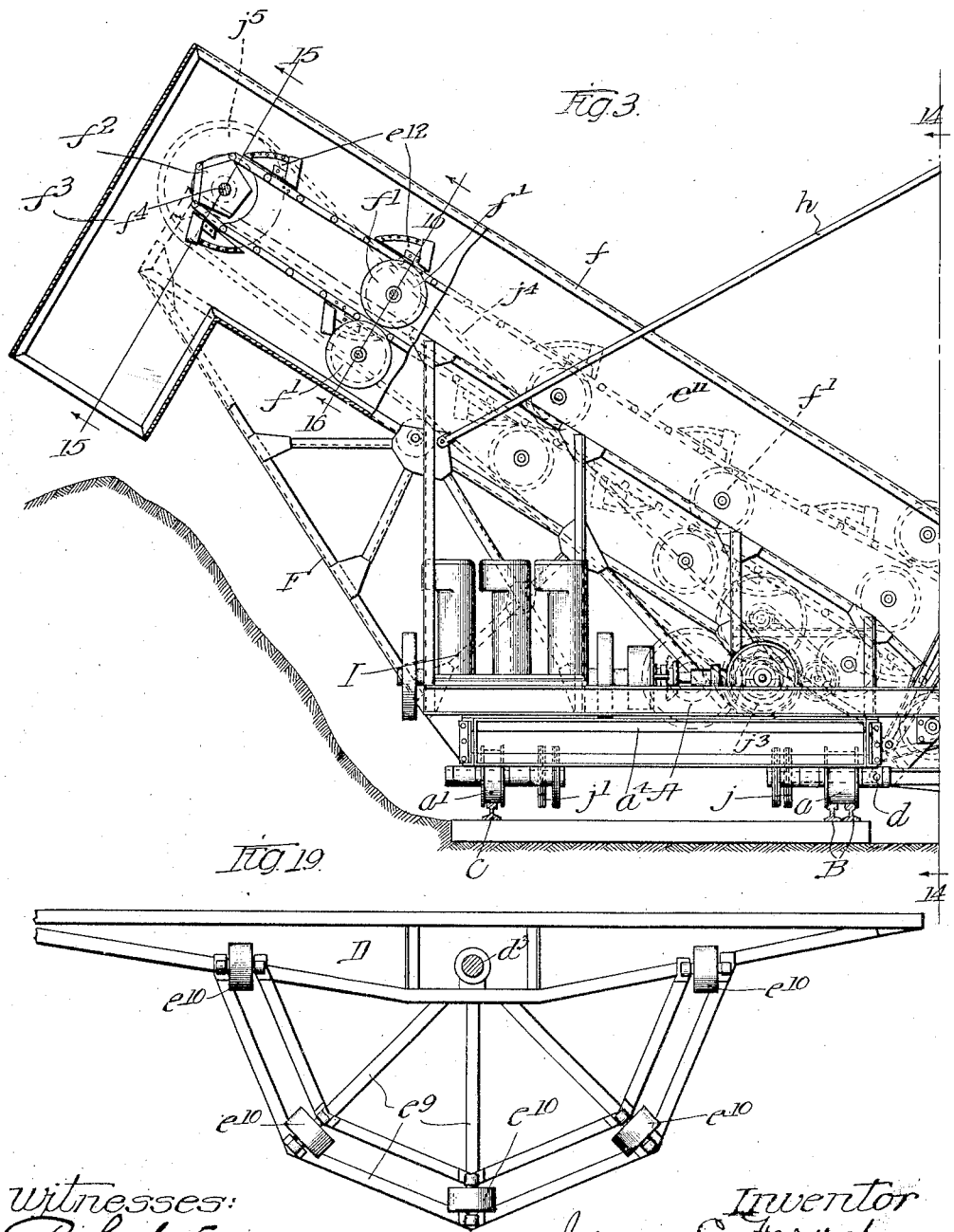

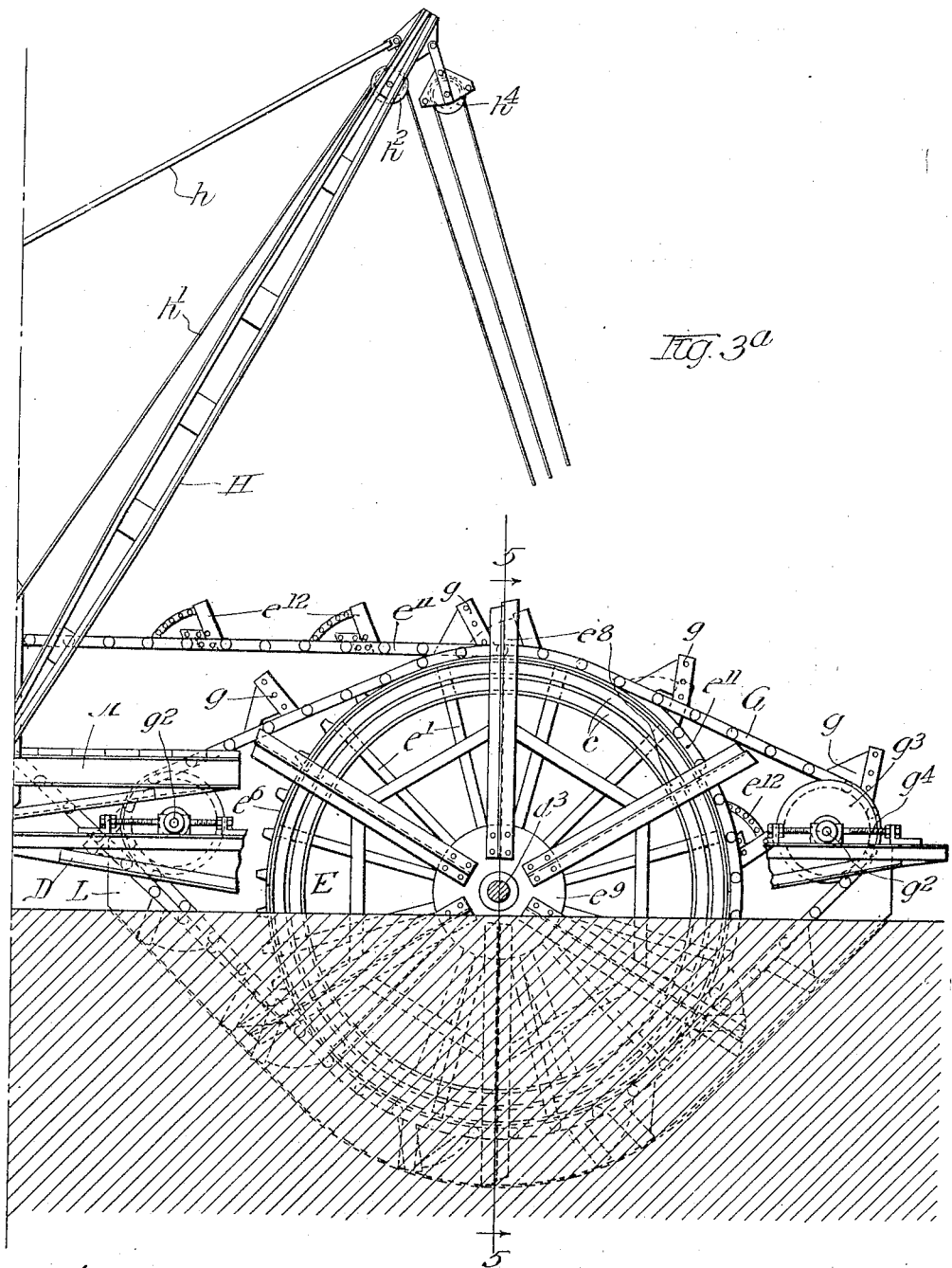

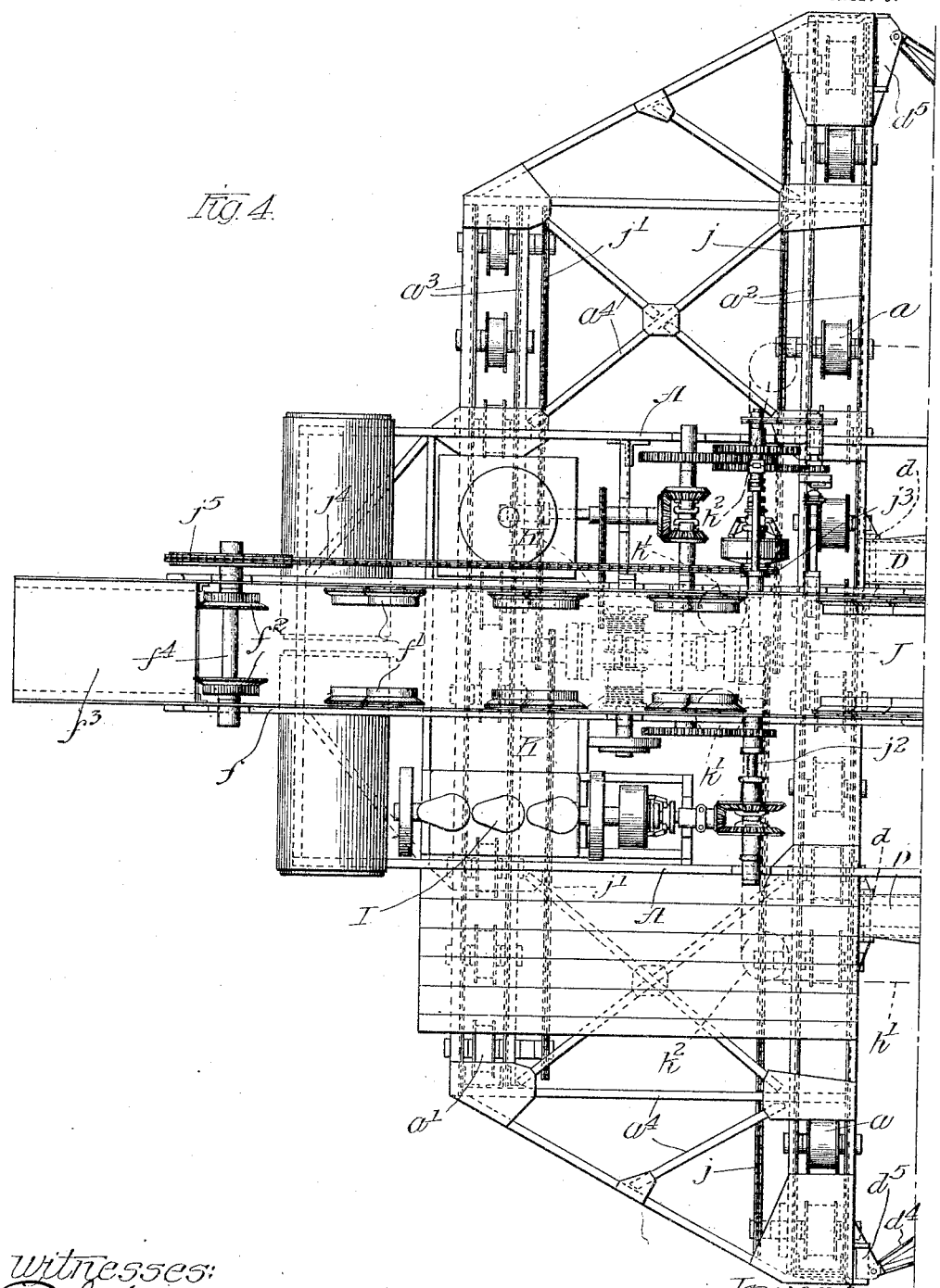

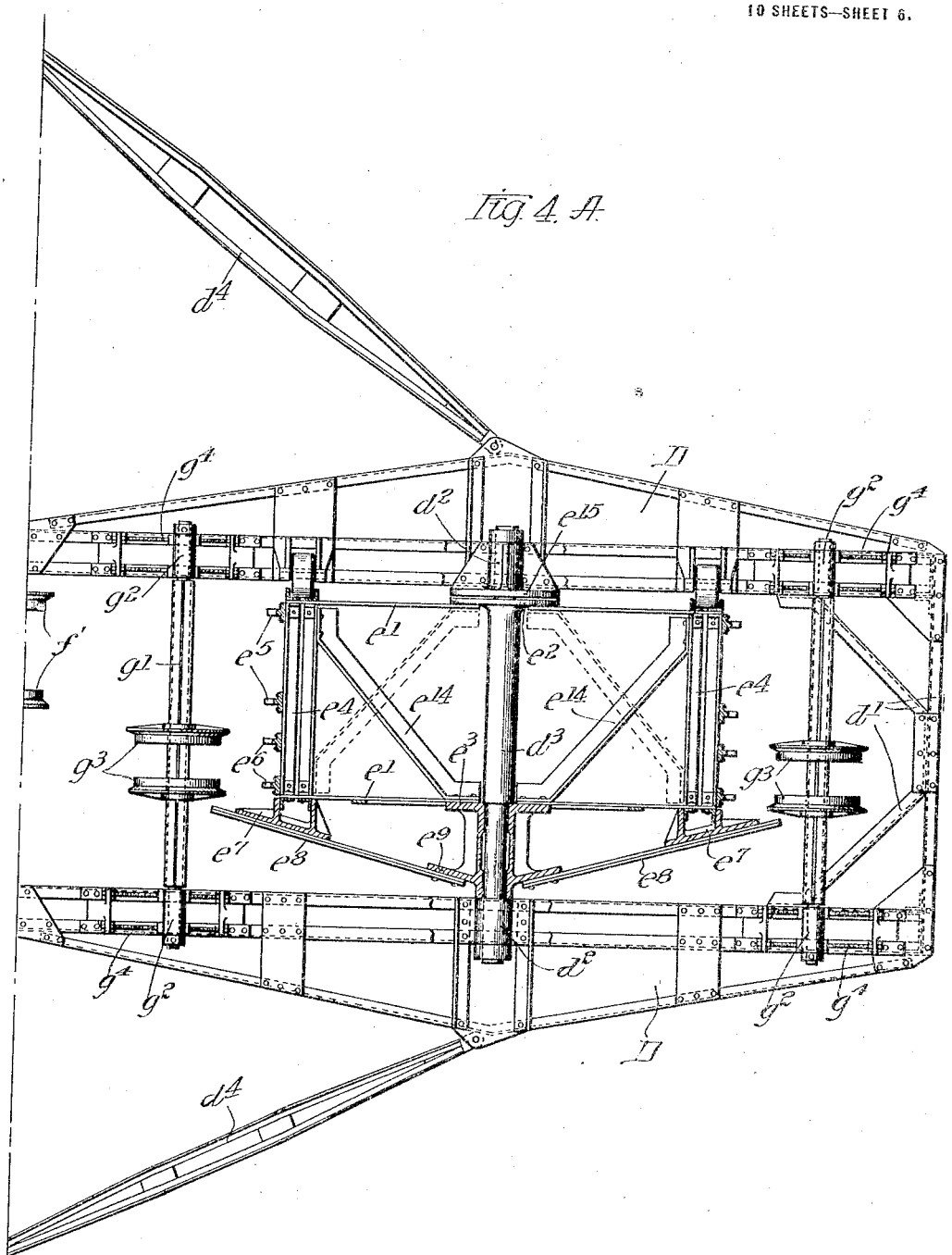

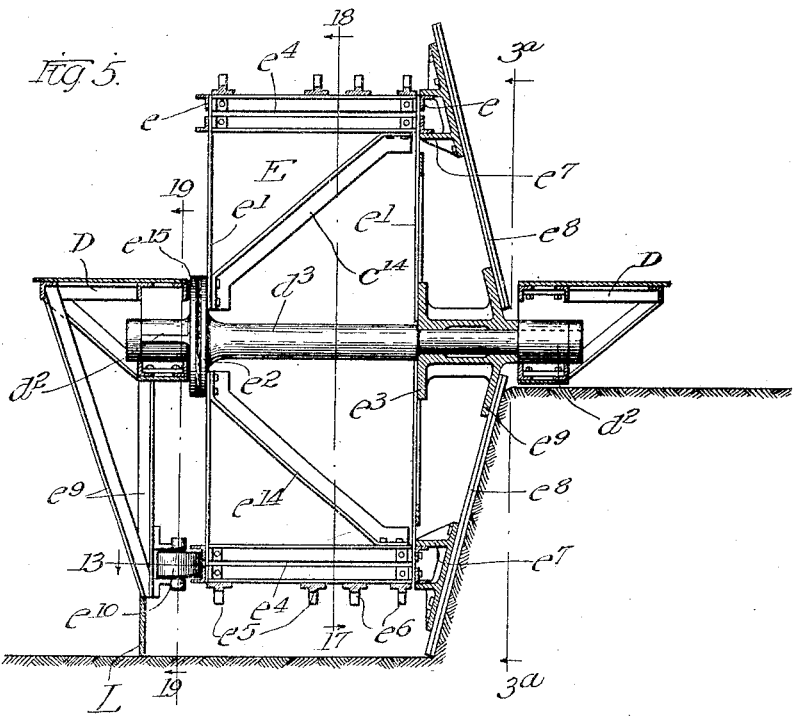

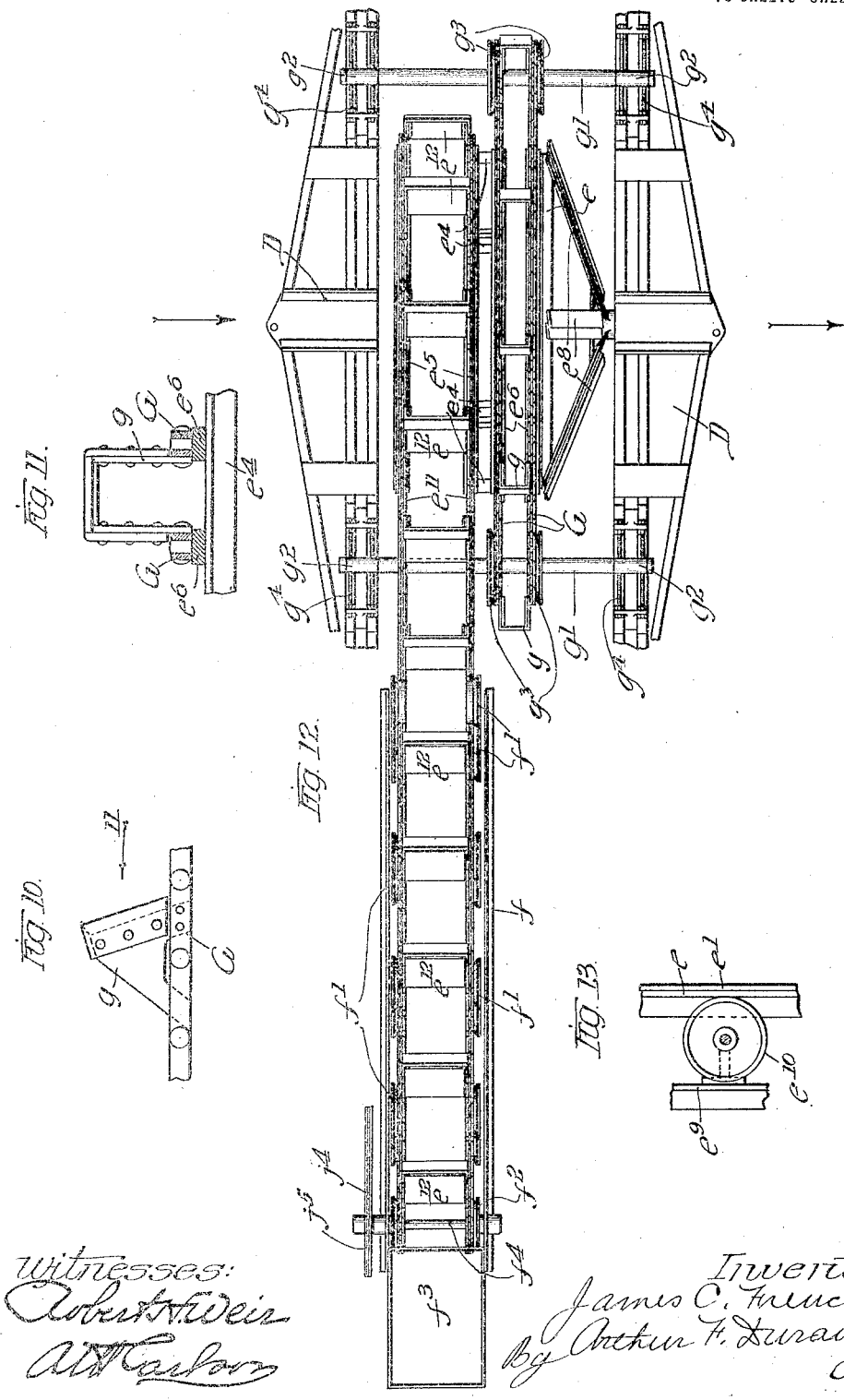

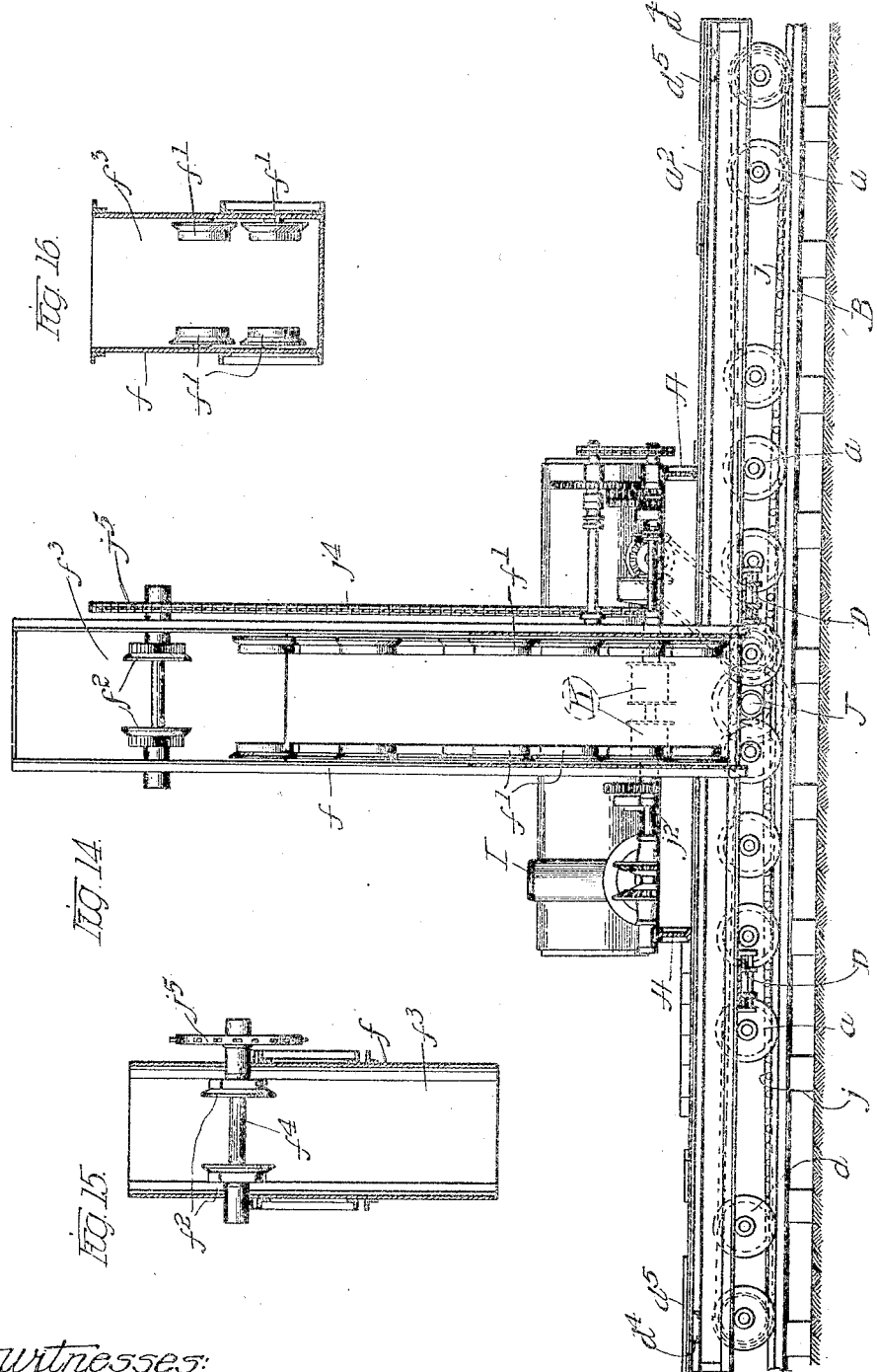

J. C. FRENCH.
BREAST CUTTER EXCAVATING MACHINE.
APPLICATION FILED NOV. 6, 1913.

1,329,591.

Patented Feb. 3, 1920.
10 SHEETS—SHEET 10.

Witnesses:

Inventor
James C. French
By Arthur F. Durand
Atty.

UNITED STATES PATENT OFFICE.

JAMES C. FRENCH, OF KENOSHA, WISCONSIN, ASSIGNOR TO FREDERICK C. AUSTIN, OF CHICAGO, ILLINOIS.

BREAST-CUTTER EXCAVATING-MACHINE.

1,329,591.  Specification of Letters Patent.  Patented Feb. 3, 1920.

Application filed November 6, 1913. Serial No. 799,435.

*To all whom it may concern:*

Be it known that I, JAMES C. FRENCH, a citizen of the United States of America, and resident of Kenosha, Kenosha county, Wisconsin, have invented a certain new and useful Improvement in Breast-Cutter Excavating-Machines, of which the following is a specification.

My invention relates to excavators of that particular kind in which the excavating apparatus is adapted to operate while the entire excavator is moving ahead in the direction of the ditch, the said apparatus having provisions for operating on the breast of the ditch, as well as on each side thereof, whereby it is not necessary to alternately raise and lower the said apparatus during the progress of the work, inasmuch as the excavating operation and the forward motion of the excavator are necessarily, in a breast cutting excavator, carried on at one and the same time, and without the necessity of stopping the operation of said apparatus to permit the excavator to advance in the desired direction.

Generally stated the object of my invention is to provide a novel and efficient excavator of the foregoing general character.

A special object is to provide an excavator for general purposes, such as making ditches, etc., but which can also be used to advantage, without loss of time, in cleaning out old ditches.

It is also an object to provide certain details and combinations tending to increase the general efficiency of an excavator of this particular character.

To these and other useful ends, my invention consists in matters hereinafter set forth and claimed.

In the accompanying drawings:

Figure 1 is a front elevation of a breast cutting excavating machine embodying the principles of my invention, showing the excavating apparatus thereof in position for operation, and illustrating the manner in which the ditch is formed with sloping banks.

Fig. 2 is a similar view, but showing the said excavating apparatus, including the breast cutting devices, raised out of working position.

Fig. 3 is an enlarged front elevation of the discharge side of the machine, showing certain portions thereof broken away to bring interior parts into view.

Fig. 3$^a$ is a similar view of the operating side of the said machine, being a section taken vertically through the ground immediately in advance of the excavating apparatus.

Fig. 4 is a plan, on the same scale as Fig. 3, of the said discharge side of the machine.

Fig. 4$^a$ is a similar view of the operating side of the machine, showing certain portions thereof in horizontal section.

Fig. 5 is a vertical section on line 5—5 in Fig. 3$^a$.

Fig. 6 is an enlarged side elevation of one of the excavating buckets.

Fig. 7 is a similar view showing the said bucket in carrying position.

Fig. 8 is a similar view showing said bucket in dumping position.

Fig. 9 is a section on line 9—9 in Fig. 6.

Fig. 10 is an enlarged side elevation of one of the cutters by which the sloping sides of the bank are formed.

Fig. 11 is a front elevation of the cutter shown in Fig. 10.

Fig. 12 is a plan of the two endless series of excavating devices and cutters, showing the wheel on which the link belts are supported, together with adjacent portions of the frame on which the wheel is supported.

Fig. 13 is an enlarged detail section on line 13—13 in Fig. 5.

Fig. 14 is a vertical section on line 14—14 in Fig. 3.

Fig. 15 is a detail section on line 15—15 in Fig. 3.

Fig. 16 is a similar section on line 16—16 in Fig. 3.

Figure 17:
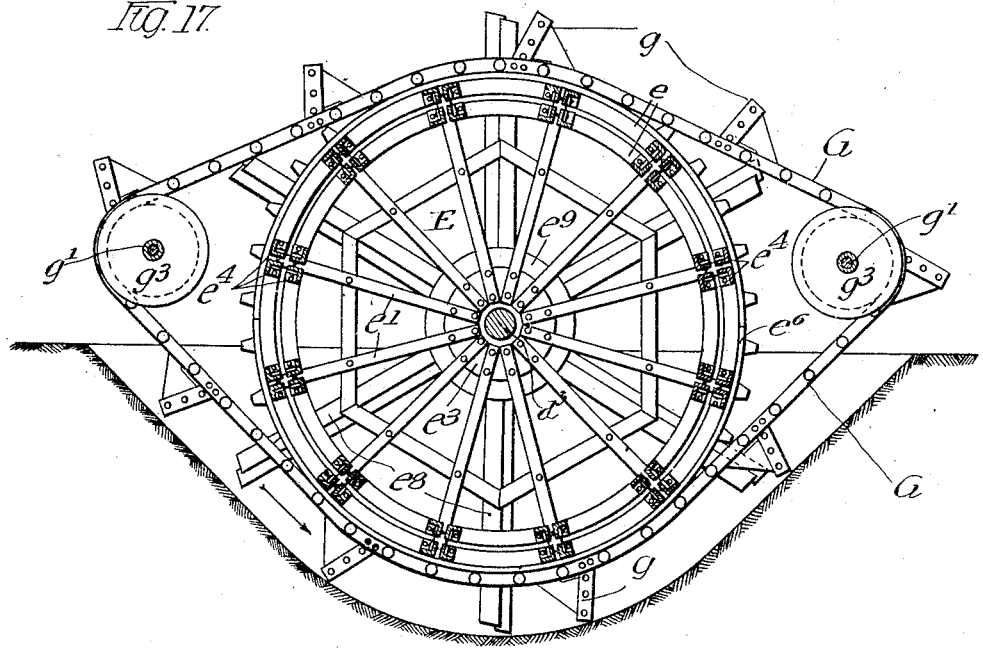
Figure 18:
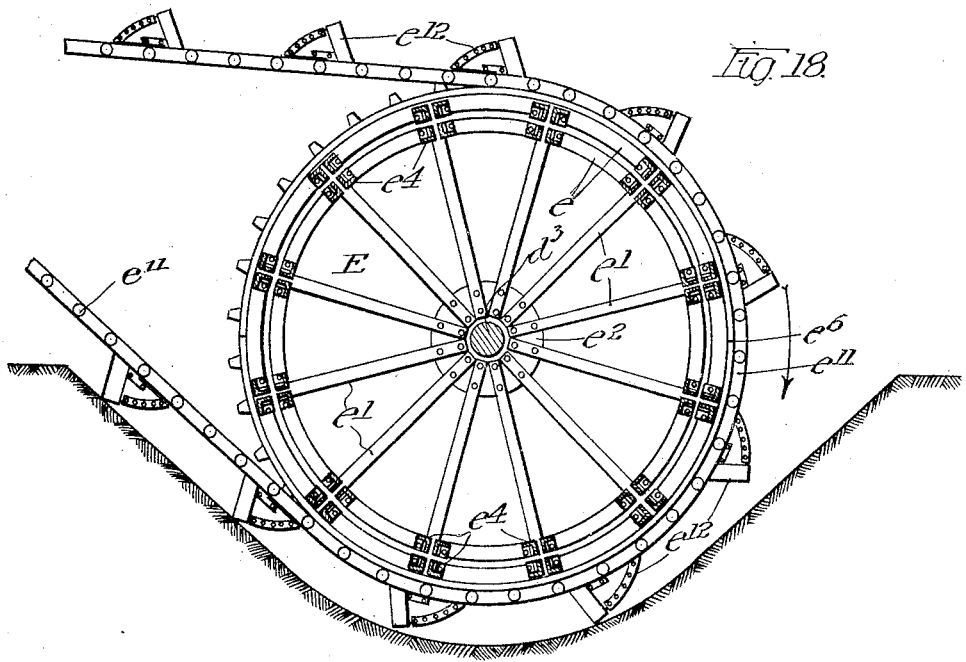

Figs. 17 and 18 are vertical sections on line 17—18 in Fig. 5, looking in opposite directions.

Fig. 19 is a vertical section on line 19—19 in Fig. 5.

As thus illustrated, my invention comprises a body frame A supported by relatively wide and double flanged car wheels $a$ and relatively narrow and double flanged wheels $a^1$, the former traveling on a double rail B, and the latter on the single rail C, said wheels being arranged in parallel rows. The row composed of the wheels $a$ is located at the ditch side of the body, and is longer than the row of wheels $a^1$, which latter are at the spoil bank side of the body. The wheels $a$ are disposed between the parallel iron beams $a^2$, and the wheels $a^1$ are disposed between the iron beams $a^3$ at the outer side of the machine. The two pairs of iron beams are connected by cross braces $a^4$ to form the body frame. With this construction and arrangement the machine rests firmly on the tracks and is not liable to be displaced therefrom.

The excavating apparatus comprises a pair of beams D pivoted at the side of the body frame at $d$, extending laterally therefrom, the outer ends of said beams being rigidly connected together by frame bars $d^1$. The said beams D are parallel and spaced apart, each beam having a bearing $d^2$. Said beams form a support for the axle $d^3$, which latter extends parallel with the body A, being disposed over the center of the ditch. The braces $d^4$ extend from the front and rear ends of the body to points on the beams D at opposite ends of said shaft. In order that the beams D may swing up and down about the pivots $d$, the braces $d^4$ are provided with hinges $d^5$ that permit them to swing up and down. A wheel E is mounted on the shaft $d^3$, said wheel having angle iron rings $e$ at front and rear, and flat spokes $e^1$ connecting said rings with the hub flanges $e^2$ and $e^3$ on the shaft. Said rings $e$ are connected by parallel bars $e^4$ which support the sprocket teeth rings $e^5$ and $e^6$, which latter are formed of segments fastened to the wheel. Bracket castings $e^7$ are fastened to the front of the wheel, adjacent the periphery thereof, and form supports for the radial knives $e^8$, the inner ends of which latter are secured to the front hub flange of the wheel. These knives have their inner ends disposed a distance forward of their outer ends, whereby the wheel has a boring action, and whereby the breast of the ditch is always sloping (see Fig. 5). The rear beam D has a framing $e^9$ extending downward therefrom (Fig. 19) in rear of the wheel. Rollers $e^{10}$ are mounted on said framing $e^9$ and disposed in position to bear against the ring $e$, which latter has a channel forming a track for said wheels. Thus the wheel is solidly backed by means for crowding it forward as the machine travels forward on the tracks. Chains $e^{11}$ travel around the wheel on the sprocket rings $e^5$, and are connected together by the buckets $e^{12}$, which latter are connected to the chains by bracket plates $e^{13}$, and are provided with open tops $e^{14}$. The body A is provided with a transversely arranged frame F having an inclined housing $f$ provided internally with wheels $f^1$ which support the chains $e^{11}$, it being seen that the endless series of buckets thus provided extends across the machine from the ditch. These wheels $f^1$ are disposed in position to direct the travel of the parallel chains $c^{11}$, and are arranged out of the path of the buckets $e^{12}$, the latter being turned upside down and dumped as they pass around the wheels $f^2$ at the extreme outer end of the elevator and conveyer thus provided; it being understood that said chains travel upward at the lower side and downward at the upper side. Thus the buckets $e^{12}$ carry the dirt from the sides and the bottom of the ditch and deliver it at the other side of the machine, without transfer thereof, discharging it onto the spoil bank. For this purpose the housing F has a spout $f^3$ at the outer end thereof, adapted to discharge the dirt downward from the buckets. By referring to Figs. 15 and 16, it will be seen that the wheels $f^1$ are mounted on the side walls of the housing $f$, the latter being closed at the bottom, but open at the top. The wheels $f^2$ are, however, mounted on the shaft $f^4$ (see Fig. 15) and adapted to drive the endless link belts $e^{11}$, serving thereby to drive the excavating wheel E while the machine is in operation. In order to give the ditch sloping banks, two templet chains G are arranged to travel upon and around the wheel E, said chains engaging the sprocket rings $e^6$ on said wheel. These chains G are spaced apart and connected together by the cutters $g$ (see Figs. 10 and 11), which operate on the side and bottom of the ditch, whereby the latter is made with sloping banks, (see Fig. 1) and whereby the work imposed on the buckets $e^{12}$ is much less than would be the case if these buckets were not preceded by means of some kind for shaping the sides of the ditch. The buckets $e^{12}$ travel a path, it will be seen, which enables them to shape the bank adjacent the machine, but at the other side these buckets follow the circular outline of the wheel, and hence means are necessary for sloping and shaping the banks of the ditch cut or bored by the wheel. Shafts $g^1$ are mounted on bearings $g^2$ on the beam D, at opposite sides of the wheel, said shafts being parallel with the axis of rotation of said wheel. These shafts $g^1$ are provided with wheels $g^3$ which support the chains G in position to operate at the required angle on the sides of the ditch. Adjusting devices $g^4$, of any suitable character, (see Fig. 3ª) are provided for moving the bearings $g^2$ on the beams D, whereby the position of the chains G on the wheel E may be changed or varied to meet the requirements. The chains G are driven by the wheel E and, therefore, by the chains $e^{11}$, inasmuch as said wheel is driven by the said bucket chains. With this arrangement the wheel cuts or bores a semicircular ditch, the cutters $g$ then flare or widen the ditch, and the loose dirt, etc., is then taken up by the buckets $e^{12}$ and carried across the machine to the other side thereof. Thus the excavating buckets serve also as an elevator or conveyer to carry the dirt over to the spoil bank, or to a wagon or car waiting to receive the discharge.

The apparatus for raising and lowering the breast cutting, excavating and elevating devices comprises a pair of booms H disposed at opposite sides of the beams D and held in an elevated position by braces or stay rods $h$ fastened to the frame F at the other side of of the body. The raising and lowering cables $h^1$ are arranged to travel over sheaves $h^2$ at the upper ends of the booms, thence down and around the block and tackle $h^3$, on the beam D, one for each beam, then upward and over the block and tackle $h^4$ on the booms, and then down to fastenings on the block and tackle below. This, of course, provides a very powerful raising and lowering apparatus, and serves as a means for carrying the breast cutting and excavating devices in an elevated position (see Fig. 2). The flexibility and arrangement of the link belts $e^{11}$ permits the beams D and associated elements to be raised and lowered in this manner.

Referring to Fig. 12, which is a diagrammatic plan of the breast cutting and excavating apparatus, it will be seen that when the machine is moving ahead in the direction indicated by the arrows, the wheel knives $e^8$ work on the breast of the ditch, (see Fig. 5) thus taking the brunt of the work. Closely following the said knives are cutters $g$, which operate transversely of the ditch, and which have plow steel edges. These cutters do some breast cutting work themselves, inasmuch as they project beyond the wheel, and thereby not only act on the inclined surfaces of the ditch, but also press forward in the direction of travel of the machine, thus trimming the sides of the ditch as the excavator moves along. The knives $e^8$ are of plow steel and are firmly bolted to the wheel at an angle which gives them a rake over the cut; and with the stiffeners $e^{14}$ set at an angle also (see Figs. 4ª and 5) the wheel has a boring as well as a slicing action while down in the ground and moving ahead. The axle $d^3$ has a thrust bearing $e^{15}$ at the rear end thereof, whereby the strains are communicated to the frame comprising the beams D, and to the braces $d^4$, thus avoiding the necessity of heavy construction. Finally, and after the dirt has been left to the rear by the cutters $g$, the buckets $e^{12}$ take up the dirt and carry it to the other side of the machine, these buckets being arranged to travel back and forth across the ditch, immediately behind said templet chains G, thus cleaning the ditch as fast as the work progresses. By referring to Fig. 3ª it will be seen that the axis of the wheel E is immediately above the ground level while the machine is at work. The wheels $g^3$ are also above the ground at this time.

The power for operating the machine, and for propelling the same along the track, is furnished by the engine I, of any suitable character, mounted on the forward portion of the body frame. (See Figs. 4 and 14.) For the broader purpose of my invention, the transmission of power from this engine to the link belts $e^{11}$, and to the wheels $a$ and $a^1$, and to the raising and lowering cables $h^1$, may be of any suitable, known or approved character. As a matter of further and special improvement, however, the transmission to said wheels $a$ includes a main drive shaft J which extends transversely of the machine, below the platform, and in the plane of the axes of said wheels. A plurality of the wheels at each side of the machine are connected by sprocket chains $j$ and $j^1$ with said shaft J, in any suitable manner, said shaft being in turn suitably connected with the engine. The longitudinally disposed shaft $j^2$ is driven by the engine, and is suitably connected to drive the sprocket wheel $j^3$, disposed below said shaft. This sprocket wheel $j^3$, is in turn connected by a sprocket chain $j^4$ with the sprocket wheel $j^5$ on the end of the shaft $f^4$, whereby the long carrier chains $e^{11}$ are driven in the required manner. A pair of drums K, driven by the engine in any suitable manner, have the raising and lowering cables $h^1$ wound thereon, said cables being arranged to travel on sheaves $h^1$ and $h^2$ disposed in position to rotate about vertical axes. With this arrangement the said raising and lowering cables are operated to raise and lower the excavating apparatus. It will be understood, of course, that the gearing and clutches necessary for controlling the various instrumentalities, whereby the rotation of the wheels $a$ and $a^1$ may be reversed and started and stopped, and whereby the winding drums K may be controlled to wind up or pay out the cables, can be of any suitable, known or approved character. This is also true of the gearing and clutches whereby the operation of the chains $e^{11}$ is started and stopped and reversed, as occasion may require. Such gearing and clutches are common in machines of this kind and do not require any detailed description thereof.

The mode of operation is as follows: The tracks B and C having been properly laid along one side of the course to be followed by the proposed ditch, the machine is then brought into position, as shown in Fig. 2. with the excavating apparatus in the elevated position shown. The engine I having been started, the transmission is then controlled in a manner to operate the chains $e^{11}$ in the direction indicated by the arrows in Fig. 1, and at the same time the cables $h^1$ are gradually paid out, whereby the excavating apparatus is caused to gradually sink into the ground. When the required depth is reached, as shown in Fig. 3ª, the transmission from the engine is then controlled for the purpose of operating the supporting wheels $a$ and $a^1$, with the result that the wheel E bores and cuts its way through the ground, leaving a channel of the required depth behind. At the same time, and as previously stated, the cutters $g$ are operating, and this serves to trim and shape the sides of the ditch, causing the same to have sloping or flaring banks, as shown in Fig. 1. The dirt thus cut away is left behind the templet chains G, as the machine moves ahead, and all of this loose dirt is taken up by the buckets $e^{12}$ and carried to the other side of the machine. When the end of the ditch is reached the excavating apparatus is again raised to the position shown in Fig. 2, and the machine can then be backed or driven ahead without operating the excavating apparatus.

A breast cutting excavating machine of the foregoing character and construction can be used for various purposes. For example it can be used for cleaning out old ditches without any loss of time, inasmuch as the buckets do not have to be raised and lowered in order to permit the machine to travel forward. Inasmuch as the buckets travel from the ditch to the point of discharge, it follows that the presence of water and mud in the ditch will not interfere with the operation of the machine, as the loaded buckets will pass upwardly through the housing or mud shield $f$ to the point of discharge at the other side of the machine. In other words, the excavated material is taken out of the ditch and discharged on the spoil bank by one and the same means and by one and the same operation. Consequently, and as stated, the presence of water and mud in the ditch will not interfere with the operation of the machine, inasmuch as the buckets do not discharge their loads until they reach the discharge point over the spoil bank.

Preferably, the construction of the machine is such that the center of gravity is somewhere between the wheels or traction rollers $a$ and $a^1$, thus insuring against upsetting of the machine; also, and by reason of the use of positive tracks and double flanged wheels or rollers, the skewing action or side thrust to which the machine is subject while in operation will not derail or twist the machine out of position, as it is firmly and securely held to its desired path of travel. As the wheels or traction rollers are driven at front and rear of the machine, and at different points along the rails, the traction afforded thereby is very powerful and amply sufficient to keep the excavating apparatus moving forward through the ground, even though the latter may be hard or stony in character.

With further respect to the steady advancement of the machine, while the excavating apparatus is in operation, and without the necessity of raising the same out of the ditch until the end thereof is reached, it may be found desirable to provide a shield or scraper L in rear of the carrier buckets $e^{12}$, the said shield or scraper being suitably secured to the framing $e^9$, and being of such shape that its edges conform to the cross sectional contour of the ditch. With this provision any loose dirt left behind by the excavating and carrier buckets $e^{12}$ will be shifted forward by the said shield or scraper L, and in this way the bottom and the sides of the ditch will be left with clean and smooth surfaces as the machine travels along.

With further reference to the adjusting devices $g^4$, it will be seen that these are useful in various ways. For example, and when the excavating apparatus including the wheel E is raised or lowered to vary the depth of the ditch, these adjusting devices are then available for the purpose of insuring the same angle for the banks at opposite sides of the ditch. As shown in Fig. 1, the said excavating apparatus is operating at a certain depth. Suppose, however, that a ditch of less depth is desired and that for this purpose the said excavating apparatus is raised to the desired position. In such case, and after the beams and wheel E have been brought to the required position, it will be found that the outer side of the ditch is being formed with a more vertical bank than the inner side—that is to say, that the outer side of the ditch is quite steep, whereas the side of the ditch adjacent the machine is quite sloping. In order, therefore, to counteract this inequality in the angles of the sides or banks of the ditch, the adjusting devices $g^4$ are operated in such manner as to shift the shafts $g^1$ toward the outer side of the ditch and away from the side of the machine, whereby the chains G are adjusted or regulated to cause the two sides of the bank to have the same angle. In a similar manner, and should the depth for the ditch be greater than that shown in Fig. 1, it would then be necessary to operate the devices $g^4$ in such a manner that the shafts $g^1$ will be moved bodily toward the machine, and away from the outer side of the ditch, thereby causing the inner side of the ditch to have the same slope or angle as the outer side thereof.

The wheel E may be secured to the axle $d^3$, as shown in the drawings, whereby the said axle will revolve in the bearings $d^2$ in the manner shown and described. However, and if desired, the said axle may be held stationary, and the wheel can then revolve on the axle, inasmuch as the power is transferred directly to the wheel, and not through the axle to the wheel.

Referring to Fig. 5, it will be seen that the knives $e^8$ are inclined rearwardly at their outer ends, so that the bank or breast of the excavation against which the wheel is working is inclined slightly forward. Also, these knives, it will be seen, are preferably long enough to extend to the bottom of the ditch, and the carrying buckets $e^{12}$, as well as the bottomless buckets $g$ simply work in the loose dirt and serve to smooth and finish the bottom and sides of the ditch. As shown, said buckets are mounted on sprocket chains or endless belts, but in a general way these buckets are carried by the wheel, and I do not limit myself to the exact construction shown and described.

What I claim as my invention is:

1. An excavating machine for making ditches, comprising a wheel, a frame for supporting said wheel for rotation about a horizontal axis, apparatus for moving said frame up and down, devices for detaching the dirt from the breast of the ditch, disposed on the face of said wheel, a traveling body for carrying the wheel forward in the direction of said axis, to crowd the said devices against the breast of the ditch, means for providing the ditch with sloping sides, mounted to travel around said wheel, and instrumentalities for carrying away the loose dirt from behind said means.

2. An excavating machine for making ditches, as specified in claim 1, and mechanism for operating said instrumentalities, serving to rotate said wheel.

3. An excavating machine for making ditches, as specified in claim 1, and idlers for supporting said means at opposite sides of the wheel, carried on said frame.

4. An excavating machine for making ditches, as specified in claim 1, and a scraper disposed behind said instrumentalities, conforming to the sides and bottom of the ditch.

5. An excavating machine for making ditches, as specified in claim 1, and mechanism for adjusting said means, supported on said frame in front and rear of said wheel, operative to shift said means crosswise of the ditch.

6. An excavating machine for making ditches, as specified in claim 1, said means including an endless series of cutters, sprocket chains for said cutters, and sprocket rings for operating said chains, forming part of said wheel.

7. An excavating machine for making ditches, as specified in claim 1, and mechanism for operating said instrumentalities, serving to rotate said wheel, said means including an endless series of cutters, sprocket chains for said cutters, and sprocket rings for operating said chains, forming part of said wheel.

8. An excavating machine for making ditches, as specified in claim 1, and idlers for supporting said means at opposite sides of the wheel, carried on said frame, said means including an endless series of cutters, sprocket chains for said cutters, and sprocket rings for operating said chains, forming part of said wheel.

9. An excavating machine for making ditches, as specified in claim 1, and a scraper disposed behind said instrumentalities, conforming to the sides and bottom of the ditch, said means including an endless series of cutters, sprocket chains for said cutters, and sprocket rings for operating said chains, forming part of said wheel.

10. An excavating machine for making ditches, as specified in claim 1, and mechanism for adjusting said means, supported on said frame in front and rear of said wheel, operative to shift said means crosswise of the ditch, said means including an endless series of cutters, sprocket chains for said cutters, and sprocket rings for operating said chains, forming part of said wheel.

11. An excavating machine for making ditches, as specified in claim 1, said instrumentalities including sprocket chains extending across the said body, buckets on said chains, operative to carry the dirt from the ditch and discharge the same on to the spoil bank at the other side of the body, and elements for engaging said chains, secured to said wheel.

12. An excavating machine for making ditches, as specified in claim 1, and mechanism for operating said instrumentalities, serving to rotate said wheel, said instrumentalities including sprocket chains extending across the said body, buckets on said chains, operative to carry the dirt from the ditch and discharge the same on to the spoil bank at the other side of the body, and elements for engaging said chains, secured to said wheel.

13. An excavating machine for making ditches, as specified in claim 1 and idlers for supporting said means at opposite sides of the wheel, carried on said frame, said instrumentalities including sprocket chains extending across the said body, buckets on said chains, operative to carry the dirt from the ditch and discharge the same on to the spoil bank at the other side of the body, and elements for engaging said chains, secured to said wheel.

14. An excavating machine for making ditches, as specified in claim 1, and a scraper disposed behind said instrumentalities, conforming to the sides and bottom of the ditch, said instrumentalities including sprocket chains extending across the said body, buckets on said chains, operative to carry the dirt from the ditch and discharge the same on to the spoil bank at the other side of the body, and elements for engaging said chains, secured to said wheel.

15. An excavating machine for making ditches, as specified in claim 1, and mechanism for adjusting said means, supported on said frame in front and rear of said wheel, operative to shift said means crosswise of the ditch, said instrumentalities including sprocket chains extending across the said body, buckets on said chains, operative to carry the dirt from the ditch and discharge the same on to the spoil bank at the other side of the body, and elements for engaging said chains, secured to said wheel.

16. An excavating machine for making ditches, as specified in claim 1, said means being disposed immediately in rear of said devices, and said wheel having provisions for driving said means.

17. An excavating machine for making ditches, as specified in claim 1, and mechanism for operating said instrumentalities, serving to rotate said wheel, said means being disposed immediately in rear of said devices, and said wheel having provisions for driving said means.

18. An excavating machine for making ditches, as specified in claim 1, and idlers for supporting said means at opposite sides of the wheel, carried on said frame, said means being disposed immediately in rear of said devices, and said wheel having provisions for driving said means.

19. An excavating machine for making ditches, as specified in claim 1, and a scraper disposed behind said instrumentalities, conforming to the sides and bottom of the ditch, said means being disposed immediately in rear of said devices, and said wheel having provisions for driving said means.

20. An excavating machine for making ditches, as specified in claim 1, and mechanism for adjusting said means, supported on said frame in front and rear of said wheel, operative to shift said means crosswise of the ditch, said means being disposed immediately in rear of said devices, and said wheel having provisions for driving said means.

21. An excavating machine for making ditches, as specified in claim 1, said frame being pivoted on the said body, and said instrumentalities including an endless series of buckets arranged to travel back and forth above the axis about which the said frame swings up and down.

22. An excavating machine for making ditches, as specified in claim 1, and mechanism for operating said instrumentalities, serving to rotate said wheel, said frame being pivoted on the said body, and said instrumentalities including an endless series of buckets arranged to travel back and forth above the axis about which the said frame swings up and down.

23. An excavating machine for making ditches, as specified in claim 1, and idlers for supporting said means at opposite sides of the wheel, carried on said frame, said frame being pivoted on the said body, and said instrumentalities including an endless series of buckets arranged to travel back and forth above the axis about which the said frame swings up and down.

24. An excavating machine for making ditches, as specified in claim 1, and a scraper disposed behind said instrumentalities, conforming to the sides and bottom of the ditch, said frame being pivoted on the said body, and said instrumentalities including an endless series of buckets arranged to travel back and forth above the axis about which the said frame swings up and down.

25. An excavating machine for making ditches, as specified in claim 1, and mechanism for adjusting said means, supported on said frame in front and rear of said wheel, operative to shift said means crosswise of the ditch, said frame being pivoted on the said body, and said instrumentalities including an endless series of buckets arranged to travel back and forth above the axis about which the said frame swings up and down.

26. An excavating machine for making ditches, as specified in claim 1, said instrumentalities including a series of excavating buckets extending around the wheel and upward therefrom to a point over the spoil bank at the other side of the body.

27. An excavating machine for making ditches, as specified in claim 1, and mechanism for operating said instrumentalities, serving to rotate said wheel, said instrumentalities including a series of excavating buckets extending around the wheel and upward therefrom to a point over the spoil bank at the other side of the body.

28. An excavating machine for making ditches, as specified in claim 1, and idlers for supporting said means at opposite sides of the wheel, carried on said frame, said instrumentalities including a series of excavating buckets extending around the wheel and upward therefrom to a point over the spoil bank at the other side of the body.

29. An excavating machine for making ditches, as specified in claim 1, and a scraper disposed behind said instrumentalities conforming to the sides and bottom of the ditch, said instrumentalities including a series of excavating buckets extending around the wheel and upward therefrom to a point over the spoil bank at the other side of the body.

30. An excavating machine for making ditches, as specified in claim 1, and mechanism for adjusting said means, supported on said frame in front and rear of said wheel, operative to shift said means crosswise of the ditch, said instrumentalities including a series of excavating buckets extending around the wheel and upward therefrom to a point over the spoil bank at the other side of the body.

31. An excavating machine for making ditches, as specified in claim 1, the said frame including parallel members disposed in front and rear of said wheel, pivoted at their inner ends to said body, connected together at their outer ends, and rollers on the rear member, said wheel having a ring track for engaging said rollers.

32. An excavating machine for making ditches, as specified in claim 1, and mechanism for operating said instrumentalities, serving to rotate said wheel, the said frame including parallel members disposed in front and rear of said wheel, pivoted at their inner ends to said body, connected together at their outer ends, and rollers on the rear member, said wheel having a ring track for engaging said rollers.

33. An excavating machine for making ditches as specified in claim 1, and idlers for supporting said means at opposite sides of the wheel, carried in said frame, the said frame including parallel members disposed in front and rear of said wheel, pivoted at their inner ends to said body, connected together at their outer ends, and rollers on the rear member, said wheel having a ring track for engaging said rollers.

34. An excavating machine for making ditches, as specified in claim 1, and a scraper disposed behind said instrumentalities, conforming to the sides and bottom of the ditch, the said frame including parallel members disposed in front and rear of said wheel, pivoted at their inner ends to said body, connected together at their outer ends, and rollers on the rear member, said wheel having a ring track for engaging said rollers.

35. An excavating machine for making ditches, as specified in claim 1, and mechanism for adjusting said means, supported on said frame in front and rear of said wheel, operative to shift said means crosswise of the ditch, the said frame including parallel members disposed in front and rear of said wheel, pivoted at their inner ends to said body, connected together at their outer ends, and rollers on the rear member, said wheel having a ring track for engaging said rollers.

36. An excavating machine for making ditches, as specified in claim 1, the said devices comprising knives set at an angle with their inner ends in advance of their outer ends, and brackets for supporting said knives in front of said means, secured to said wheel.

37. An excavating machine for making ditches, as specified in claim 1, and mechanism for operating said instrumentalities, serving to rotate said wheel, the said devices comprising knives set at an angle with their inner ends in advance of their outer ends, and brackets for supporting said knives in front of said means, secured to said wheel.

38. An excavating machine for making ditches, as specified in claim 1, and idlers for supporting said means at opposite sides of the wheel, carried on said frame, the said devices comprising knives set at an angle with their inner ends in advance of their outer ends, and brackets for supporting said knives in front of said means, secured to said wheel.

39. An excavating machine for making ditches, as specified in claim 1, and a scraper disposed behind said instrumentalities, conforming to the sides and bottom of the ditch, the said devices comprising knives set at an angle with their inner ends in advance of their outer ends, and brackets for supporting said knives in front of said means, secured to said wheel.

40. An excavating machine for making ditches, as specified in claim 1, and mechanism for adjusting said means, supported on said frame in front and rear of said wheel, operative to shift said means crosswise of the ditch, the said devices comprising knives set at an angle with their inner ends in advance of their outer ends, and brackets for supporting said knives in front of said means, secured to said wheel.

41. An excavating machine for making ditches, as specified in claim 1, said means including an endless sprocket chain operated by said wheel, and cutters mounted on said chain, said devices describing a circle, and said cutters following said circle at top and bottom but having straight paths of travel at the sides.

42. An excavating machine for making ditches, as specified in claim 1, and mechanism for operating said instrumentalities, serving to rotate said wheel, said means including an endless sprocket chain operated by said wheel, and cutters mounted on said chain, said devices describing a circle, and said cutters following said circle at top and bottom, but having straight paths of travel at the sides.

43. An excavating machine for making ditches, as specified in claim 1, and idlers for supporting said means at opposite sides of the wheel, carried on said frame, said means including an endless sprocket chain operated by said wheel, and cutters mounted on said chain, said devices describing a circle, and said cutters following said circle at top and bottom, but having straight paths of travel at the sides.

44. An excavating machine for making ditches, as specified in claim 1, and a scraper disposed behind said instrumentalities, conforming to the sides and bottom of the ditch, said means including an endless sprocket chain operated by said wheel, and cutters mounted on said chain, said devices describing a circle, and said cutters following said circle at top and bottom, but having straight paths of travel at the sides.

45. An excavating machine for making ditches, as specified in claim 1, and mechanism for adjusting said means, supported on said frame in front and rear of said wheel, operative to shift said means crosswise of the ditch, said means including an endless sprocket chain operated by said wheel, and cutters mounted on said chain, said devices describing a circle, and said cutters following said circle at top and bottom, but having straight paths of travel at the sides.

46. An excavating machine for making ditches, as specified in claim 1, said instrumentalities including an excavating bucket which travels from the ditch to the other side of the excavator.

47. An excavating machine for making ditches, as specified in claim 1, and mechanism for operating said instrumentalities, serving to rotate said wheel, said instrumentalities including an excavating bucket which travels from the ditch to the other side of the excavator.

48. An excavating machine for making ditches, as specified in claim 1, together with idlers for supporting said means at opposite sides of the wheel, carried on said frame, said instrumentalities including an excavating bucket which travels from the ditch to the other side of the excavator.

49. An excavating machine for making ditches, as specified in claim 1, and a scraper disposed behind said instrumentalities, conforming to the sides and bottom of the ditch, said instrumentalities including an excavating bucket which travels from the ditch to the other side of the excavator.

50. An excavating machine for making ditches, as specified in claim 1, and mechanism for adjusting said means, supported on said frame in front and rear of said wheel, operative to shift said means crosswise of the ditch, said instrumentalities including an excavating bucket which travels from the ditch to the other side of the excavator.

51. An excavating machine for making ditches, as specified in claim 1, said instrumentalities extending across the body, to discharge the dirt a distance from the other side thereof.

52. An excavating machine for making ditches, as specified in claim 1, and mechanism for operating said instrumentalities, serving to rotate said wheel, said instrumentalities extending across the body to discharge the dirt a distance from the other side thereof.

53. An excavating machine for making ditches, as specified in claim 1, and idlers for supporting said means at opposite sides of the wheel, carried on said frame, said instrumentalities extending across the body, to discharge the dirt a distance from the other side thereof.

54. An excavating machine for making ditches, as specified in claim 1, and a scraper disposed behind said instrumentalities, conforming to the sides and bottom of the ditch, said instrumentalities extending across the body, to discharge the dirt a distance from the other side thereof.

55. An excavating machine for making ditches, as specified in claim 1, and mechanism for adjusting said means, supported on said frame in front and rear of said wheel, operative to shift said means crosswise of the ditch, said instrumentalities extending across the body, to discharge the dirt a distance from the other side thereof.

56. An excavating machine for making ditches, comprising a body provided with a laterally extending frame, digging devices carried on said frame, arranged to work on the breast of the ditch while said body is moving slowly forward, the said body being provided with driving wheels disposed in a row extending from one end of the machine to the other, and braces for said frame, diverging therefrom to points approximately at the front and rear ends of said row of wheels, said row of wheels being of a length to resist the backward pressure on said frame and thereby prevent skewing of the machine.

57. A traveling excavator comprising a rotary boring wheel, means for supporting said wheel for rotation about an axis extending in the direction of travel of said excavator, breast-cutting knives on the front side of said wheel, for detaching the dirt which then falls to the bottom of the excavation, an endless series of buckets forming a conveyer which is carried by said wheel to travel across from one side of the excavation to the other behind said knives, to scoop up said dirt, said buckets thereby serving to smooth the bottom of the excavation, and power operated mechanism for transmitting power through said conveyer to rotate said wheel in the ground while the excavator is moving forward.

58. A traveling excavator for making a trench, comprising a rotary boring wheel, means for supporting said wheel for rotation about an axis extending in the direction of travel of said excavator, breast-cutting knives on the front side of said wheel, for detaching the dirt which then falls to the bottom of the excavation, and an endless series of buckets carried by said wheel to travel across from one side of the excavation to the other behind said knives, to scoop up said dirt, said buckets thereby serving to smooth the bottom of the excavation, said knives being radially arranged with their inner ends in advance of their outer ends, to slope the breast of the excavation, and means on said wheel to slope the bank of said trench in rear of said knives.

59. A traveling excavator comprising a rotary wheel, means for supporting said wheel for rotation about an axis extending in the direction of travel of said excavator, breast-cutting knives on the front side of said wheel, for detaching the dirt which then falls to the bottom of the excavation, and an endless series of buckets carried by said wheel to travel across from one side of the excavation to the other behind said knives, to scoop up said dirt, said buckets thereby serving to smooth the bottom of the excavation, said buckets being constructed to dump their loads when turned upside down, and mechanism for operating said series of buckets to operate said wheel in the ground while the excavator is moving forward.

60. A traveling excavator comprising a boring wheel arranged for cutting a ditch at one side of the path of travel and mounted to rotate about an axis extending longitudinally of the ditch, means on the front side of said wheel for cutting the dirt away on the breast of the ditch, devices carried by the wheel for shaping the sides and smoothing the bottom of the excavation and taking up the loose excavated dirt from the bottom of the ditch, said devices including one or more excavating buckets arranged to travel from one side of the ditch to the other and operating in the ground immediately behind said means, mechanism for operating said bucket or buckets and thereby driving the wheel, said means extending downward the full depth of the ditch to cut the dirt away directly in front of said devices, and means traveling on the upper surface of the ground at the side of the ditch for supporting and moving the wheel ahead during the operation thereof in the ground.

61. An excavator comprising a boring wheel arranged for cutting a ditch at one side of the path of travel and mounted to rotate about a longitudinally extending axis, knives on the front side of said wheel for cutting the dirt away on the breast of the ditch, devices carried by the wheel for shaping the sides and smoothing the bottom of the excavation and taking up the loose excavated dirt from the bottom of the ditch, mechanism for operating said devices and thereby driving the wheel, said knives extending downward the full depth of the ditch to cut the dirt away directly in front of said devices, and means traveling on the upper surface of the ground at the side of the ditch for supporting and moving the wheel ahead during the operation thereof in the ground, said devices including an endless series of excavating buckets arranged to travel from one side of the ditch to the other and operating on the ground immediately behind said knives.

62. An excavator comprising a boring wheel arranged for cutting a ditch at one side of the path of travel and mounted to rotate about an axis extending ahead of the ditch, means on the front side of said wheel for cutting the dirt away on the breast, devices carried by the wheel for shaping the sides and smoothing the bottom of the excavation and taking up the loose excavated dirt from the bottom of the ditch, said devices including one or more excavating buckets arranged to travel from one side of the ditch to the other and operating in the ground immediately behind said means, mechanism for driving the wheel, said means extending downward the full depth of the ditch to cut the dirt away directly in front of said devices, means traveling on the upper surface of the ground at the side of the ditch for supporting and moving the wheel ahead during the operation thereof in the ground, and instrumentalities for bodily raising and lowering said wheel.

63. An excavator comprising a boring wheel arranged for cutting a ditch at one side of the path of travel and mounted to rotate about a longitudinally extending axis, means on the front side of said wheel for cutting the dirt away on the breast of the ditch, devices carried by the wheel for shaping the sides and smoothing the bottom of the excavation and taking up the loose excavated dirt from the bottom of the ditch, said devices including one or more excavating buckets arranged to travel from one side of the ditch to the other and operating in the ground immediately behind said means, mechanism for operating said buckets and thereby driving the wheel, said means extending downward the full depth of the ditch to cut the dirt away directly in front of said devices, means traveling above ground at the side of the ditch for supporting and moving the wheel ahead during the operation thereof in the ground, and a pivoted support upon which said wheel is mounted, the axis of said wheel and support being parallel.

64. An excavator comprising a boring wheel arranged for cutting a ditch at one side of the path of travel and mounted to rotate about a longitudinally extending axis, means on the front side of said wheel for cutting the dirt away on the breast of the ditch, devices carried by the wheel for shaping the sides and smoothing the bottom of the excavation and taking up the dirt, said devices including one or more excavating buckets arranged to travel from one side of the ditch to the other and operating in the ground immediately behind said means, mechanism for operating said buckets and thereby driving the wheel, said means extending downward the full depth of the ditch to cut the dirt away directly in front of said devices, means traveling on the upper surface of the ground at the side of the ditch for supporting and moving the wheel ahead during the operation thereof in the ground, said devices serving to give the ditch a sloping bank.

65. An excavator comprising a boring wheel arranged for cutting a ditch at one side of the path of travel, mounted to rotate about a longitudinally extending axis, means on the front side of said wheel for cutting the dirt away on the breast of the ditch, devices carried by the wheel for shaping the sides and smoothing the bottom of the excavation and taking up the dirt, said devices including one or more excavating buckets arranged to travel from one side of the ditch to the other and operating in the ground immediately behind said means, mechanism for operating said buckets and thereby driving the wheel, said means extending downward the full depth of the ditch to cut the dirt away directly in front of said devices, and means traveling on the upper surface of the ground at the side of the ditch for supporting and moving the wheel ahead during the operation thereof in the ground, said devices being adapted and arranged for giving the ditch a sloping bank.

66. An excavator comprising a boring wheel arranged for cutting a ditch at one side of the path of travel and mounted to rotate about a longitudinally extending axis, means on the front side of said wheel for cutting the dirt away on the breast of the ditch, devices carried by the wheel for shaping the sides and smoothing the bottom of the excavation and taking up the loose excavated dirt from the bottom of the ditch, said devices including one or more excavating buckets arranged to travel from one side of the ditch to the other and operating in the ground immediately behind said means, mechanism for operating said buckets and thereby driving the wheel, said means extending downward the full depth of the ditch to cut the dirt away directly in front of said devices, means traveling on the upper surface of the ground at the side of the ditch for supporting and moving the wheel ahead during the operation thereof, and means whereby said wheel swings up and down about an axis of said mechanism.

67. A traveling excavator for making a ditch, comprising a boring wheel having the axis thereof extending in the direction of travel, means on the front side of said wheel to cut ahead in the ground, allowing the excavated dirt to fall directly on the ground, a series of buckets for scooping the excavated dirt directly from the ground, operating from one side of the ditch to the other a distance behind and forming no part of said means by which the wheel operates on the breast of the excavation, so that the breast cutting is performed by said wheel for the full depth of the excavation and whereby said buckets shape the sides and smooth the bottom of the excavation in rear of the cutting operation, devices traveling on the upper surface of the ground to support and feed the excavator slowly forward during the operation thereof in the direction of the axis of said wheel, along a path of travel at one side of the ditch, mechanism to operate said wheel by power transmitted through said series of buckets, and means to raise said wheel and buckets out of the excavation.

68. A traveling excavator for making a ditch, comprising a boring wheel having the axis thereof extending in the direction of travel, means on the front side of said wheel to cut ahead dirt to fall directly on the ground, a series of buckets for scooping the excavated dirt from the ground, operating from one side of the ditch to the other a distance behind and forming no part of said means by which the wheel operates on the breast of the excavation so that the breast cutting is performed by said wheel for the full depth of the excavation and whereby said buckets shape the sides and smooth the bottom of the excavation, in rear of the cutting operation, devices traveling on the upper surface of the ground to support and feed the excavator slowly forward during the operation thereof in the direction of the axis of said wheel, along a path of travel at one side of the ditch, mechanism to operate said wheel by power transmitted through said series of buckets, said means including knives inclined backward at their outer ends, and said buckets being disposed immediately behind the outer end portions of said knives, and means to raise said wheel and buckets out of the excavation.

69. A traveling excavator for making a ditch, comprising a boring wheel having the axis thereof extending in the direction of travel provided, means on the front side of said wheel to cut ahead in the ground, allowing the excavated dirt to fall directly on the ground, a series of buckets for scooping the excavated dirt from the ground, operating from one side of the ditch to the other a distance behind and forming no part of said means by which the wheel operates on the breast of the excavation so that the breast cutting is performed by said wheel for the full depth of the excavation and whereby said buckets shape the sides and smooth the bottom of the excavation in rear of the cutting operation, devices traveling on the upper surface of the ground to support and feed the excavator slowly forward during the operation thereof in the direction of the axis of said wheel, along a path of travel at one side of the ditch, mechanism to operate said wheel by power transmitted through said series of buckets, a ring carried by said wheel at the rear thereof, a frame forming a backing for said buckets and wheel, and rolls engaging said ring to reduce friction between said frame and wheel, and means to raise said wheel and buckets out of the excavation.

Signed by me at Chicago, Illinois, this 25th day of October, 1913.

JAMES C. FRENCH.

Witnesses:
RACHEL J. RICHARDSON,
ROSE E. SCHUEM.